United States Patent [19]
Canterberry et al.

[11] Patent Number: 5,955,629
[45] Date of Patent: Sep. 21, 1999

[54] ENERGETIC BINDERS

[75] Inventors: J. B. Canterberry, Crawfordville, Fla.; W. H. Graham, Huntsville, Ala.

[73] Assignee: Cordant Technologies Inc., Salt Lake City, Utah

[21] Appl. No.: 07/343,977

[22] Filed: Apr. 26, 1989

Related U.S. Application Data

[62] Division of application No. 07/030,326, Mar. 26, 1987.

[51] Int. Cl.$^6$ .................................................. C07C 79/40
[52] U.S. Cl. ......................... 560/156; 558/484; 558/485; 558/487
[58] Field of Search ...................................... 558/484, 485, 558/487; 560/156

[56] References Cited

U.S. PATENT DOCUMENTS

| | | | |
|---|---|---|---|
| 2,381,406 | 8/1945 | Hoss et al. ............................... | 558/485 |
| 2,528,928 | 11/1950 | Weisblat et al. ......................... | 560/156 |
| 2,644,838 | 7/1953 | Weisblat et al. ......................... | 560/156 |
| 3,031,289 | 4/1962 | Philipson ................................. | 149/19.5 |
| 3,047,524 | 7/1962 | Bowman ................................. | 149/19.5 |
| 3,421,955 | 1/1969 | Hauser ..................................... | 149/19.5 |
| 3,644,494 | 2/1972 | Frankel et al. ........................... | 560/156 |
| 3,904,674 | 9/1975 | Frankel et al. ........................... | 560/196 |
| 3,939,184 | 2/1976 | Koensg et al. ........................... | 560/156 |
| 3,962,053 | 6/1976 | Kornblum ................................ | 560/156 |
| 4,209,636 | 6/1980 | Gutierrez et al. ........................ | 560/156 |
| 4,291,171 | 9/1981 | Baum et al. ............................. | 560/156 |
| 4,306,079 | 12/1981 | Gutierrez et al. ........................ | 560/156 |
| 4,385,948 | 5/1983 | Reed et al. ............................... | 149/19.5 |
| 4,415,728 | 11/1983 | Tremblay ................................. | 528/279 |
| 4,567,004 | 1/1986 | Blank et al. ............................ | 260/465 R |
| 4,702,857 | 10/1987 | Gosselink ................................ | 560/156 |
| 4,859,788 | 8/1989 | Brindöpke et al. ...................... | 560/156 |

FOREIGN PATENT DOCUMENTS

| | | | |
|---|---|---|---|
| 2261876 | 6/1973 | Germany ................................. | 560/156 |

*Primary Examiner*—Edward A. Miller
*Attorney, Agent, or Firm*—Pillsbury Madison & Sutro LLP; Ronald L. Lyons

[57] ABSTRACT

Liquid nitromalonate polyesters and methods for their preparation are disclosed. Solid propellants are provided which employ as the binder a nitromalonate polyester. These propellants are resistant to plasticizer syneresis and crystallization and provide an increase in the specific impulse of the propellant.

7 Claims, 3 Drawing Sheets

ENERGETIC BINDERS

This is a divisional of co-pending application Ser. No. 07/030,326 filed on Mar. 26, 1987.

BACKGROUND OF THE INVENTION

1. Field of the Invention

This invention relates to novel nitromalonate polyesters, to methods for preparing said nitromalonate polyesters, and to solid propellants which comprise a binder, an oxidizer, a plasticizer and, optionally, a metallic fuel wherein the binder is a nitromalonate polyester.

2. Description of the Prior Art

Solid propellants are commonly made by preparing a mixture of a finely divided organic or inorganic oxidizing agent, a metallic fuel, a liquid polymer binder, a curing agent for the polymer, a plasticizer and minor amounts of various modifying ingredients, introducing the resulting mixture into a motor casing and curing the mixture. The cured polymer acts both as a fuel for reaction with the oxidizing agent and as a binder to provide the propellant with the desired physical properties.

One problem with solid propellants has been that, when a plasticizer was employed in the propellant composition, the propellant frequently was subject to plasticizer synersis and crystallization. Attempts were made to overcome this problem and at least partial success was met with propellants which employed a combination of polyethylene glycol (PEG) and polycaprolactone (PCP) as the binder and a plasticizer which was a mixture of trimethylolethane trinitrate (TMETN) and butanetriol trinitrate (BTTN). This combination of PEG/PCP binder and TMETN/BTTN plasticizer was found to produce minimum smoke propellants which had excellent strain capability under low temperature storage and cycling conditions. These propellants were also less prone to crystallization of either the polymer binder or plasticizer. They were further found to be resistant to plasticizer exudation or synersis at intermediate low temperatures such as 0 to −20° F. The combination of plasticizers was found to be a very important factor in the prevention of crystallization at low temperatures. In fact, certain plasticizers or combinations of plasticizers, such as TMETN and 1/1 mixtures of TMETN and BTTN, crystallize after low temperature storage and cause severe loss in propellant strain capability to a level of less than 1–2%.

While the combination of 1 part TMETN and 2 parts BTTN does provide acceptable propellant properties, due to the very high cost of BTTN it would be highly desirable to develop a propellant which eliminates or decreases the level of BTTN needed to prevent plasticizer crystallization while still maintaining the desirable physical properties and burn characteristics of the propellant.

Demands for higher performance, longer range minimum smoke rocket missions are a recurring theme by all military services as second generation rocket motor requirements approach or exceed the limits imposed by present state-of-the-art materials. Though these demands exist for strategic and strap-on launch applications, the most stringent requirements are mandated by tactical application. The tactical environment imposes high and low temperature requirements on the propellants which can severely limit the utilization of otherwise attractive propellant ingredients. Problems encountered include limitations of shelflife imposed by marginal high-temperature stability and propellant cracking and/or plasticizer syneresis. All of these problems have intensified as higher levels of nitrate ester plasticizers have been used to approach the performance requirements of current systems. The inherent thermal instability of nitrate esters, volatility, tendency toward phase separation and crystallization at low temperature impose important trade-off considerations which can limit their utilization. On the other hand, propellant processing and mechanical property requirements also place upper limits on the level of nitramines which can be formulated.

State-of-the-art polymer ingredients, with the exception of nitrocellulose, are non-energetic materials. Because minimum smoke propellants, in general, are under-oxidized since the nitramine "oxidizers" are actually monopropellants, the inert polymer causes a steep decline in specific impulse as the plasticizer/polymer ratio is decreased. If sufficiently stable energetic or oxidizing groups can be incorporated into the polymer without otherwise degrading the binder properties, then the propellant performance and specific impulse can be significantly increased.

Another important consideration in designing high energy polymers is the composition of the exhaust gases after combustion. Higher oxygen content binders reduce the content of hydrogen and carbon monoxide in the exhaust gases. Reducing these fuel-rich gases is necessary if the afterburning of the exhaust plume is to be effectively minimized. This consideration, along with smoke reduction, is important in designing minimum signature rocket motors.

Historically, the original high-energy polymeric material was nitrocellulose. Although nitrocellulose was used early for non-energetic applications such as motion picture film and billiard balls, its principle use has been in the explosives and munitions industry. Depending on the degree of nitration of the cellulose, the cellulose and the materials with it is mixed, nitrocellulose finds applications in smokeless powder and double-base propellants. The nitrate ester linkage ($RONO_2$) present in nitrocellulose provides a very high and energetic oxygen content; however, like the nitrate ester plasticizers such as nitroglycerine, nitrocellulose has marginal thermal stability for tactical environmental scenarios.

In recent years, other energetic functional groups have been incorporated into polymers as well as plasticizer and oxidizer materials. In some cases, such as the extensive research and development effort into organic nitrogen-fluorine chemistry in the 1960's, no materials are currently being considered for high energy applications. Factors which have limited the application of N-F compounds include cost, chemical stability, and sensitivity.

It will be noted that nearly all of the high-energy polymers currently under investigation are hydroxyl functional. These materials, in conjunction with an isocyanate cure agent, are favored in minimum smoke formulations which contain nitrate esters because of excellent compatibility. Other potential functional groups such as carboxylic acid and thiols, which have been used in composite propellant formulations, are incompatible with nitrate esters. This requirement and the ready availability of a wide variety of hydroxyl-terminated polymers has led to their favored position for use in minimum smoke binders.

Thus, it would be highly desirable to provide a polymeric binder for solid propellants which is compatible with the other propellant ingredients, provides acceptable propellant physical properties, prevents or minimizes plasticizer syneresis and crystallization and has a high-energy potential which will contribute to the propellant's specific impulse.

SUMMARY OF THE INVENTION

In accordance with the present invention there are provided liquid polymers comprising nitromalonate polyester. These nitromalonate polyesters include polymers of the general formula:

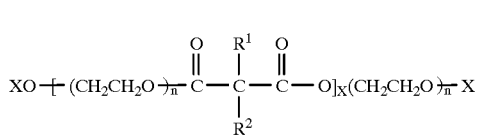
(I)

where $R^1$ and $R^2$ are the same or different and are selected from $-NO_2$, $-R^3ONO_2$, alkyl, $-F$ and $-H$ with the proviso that at least one of $R^1$ and $R^2$ is $-NO_2$ or $-R^3ONO_2$;

$R^3$ is alkylene;

X is $-H$,

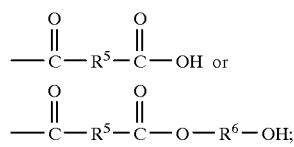

$R^5$ is $-CH=CH-$ or $-CH_2CH_2-$;
$R^6$ is alkylene;

n is at each independent occurrence an integer from 1 to about 40; and x is an integer, preferably from 1 to about 40.

Also in accordance with this invention there are provided improved solid propellants comprising a polymeric binder, binder curing agent, oxidizer, optional metallic fuel, and a plasticizer, wherein the improvement comprises employing as the binder an effective amount of a polymeric binder which is a nitromalonate polyester. These nitromalonate polyesters include those defined by formula (I) above. This invention further provides such improved solid propellants which contain a plasticizer that is substantially free of butanetriol trinitrate.

There is further provided in accordance with this invention a method of preparing a nitromalonate polyester comprising:

A. reacting malonic acid or a derivative thereof and a slight excess of a diol to form a hydroxy-terminated malonate polyester of the formula:

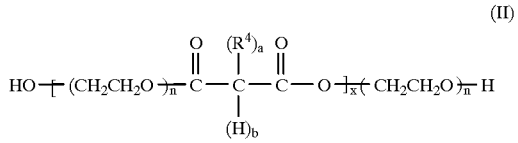
(II)

wherein $R^4$ is alkyl;

n is at each independent occurrence an integer from 1 to about 40; and x is are integer, preferably from 1 to about 40;

a is 0 or 1, b is 1 or 2 and a+b=2;

B. end-capping the hydroxy-terminated malonate polyester formed in step A with a cyclic anhydride to form a malonate polyester of the formula:

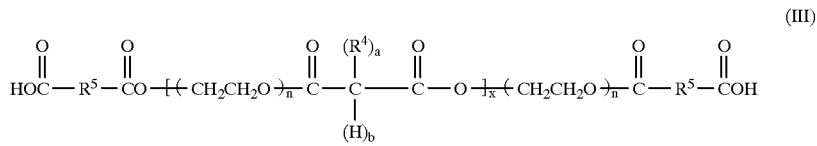
(III)

wherein $R^4$, n, x, a and b are as previously defined; and $R^5$ is $-CH=CH-$ or $-CH_2CH_2-$; and C. nitrating the product of step B with $HNO_3$ to produce a nitromalonate polyester of the formula:

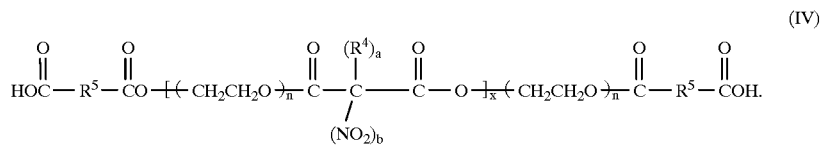
(IV)

wherein $R^4$, n, x, a, b and $R^5$ are as previously defined.

In accordance with the present invention there is also provided a method for preparing a nitromalonate polyester comprising:

A. reacting malonic acid or a derivative thereof and a slight excess of a diol to form a hydroxy-terminated malonate polyester having the formula:

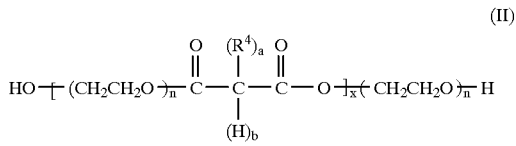
(II)

wherein
$R^4$ is alkyl;
n is at each independent occurrence an integer from 1 to about 40;
x is and integer, preferably from 1 to about 40;
a is 0 or 1, b is 1 or 2 and a+b=2;

B. end-capping the hydroxy-terminated malonate polyester formed in step A with a cyclic anhydride to form a malonate polyester of the formula:

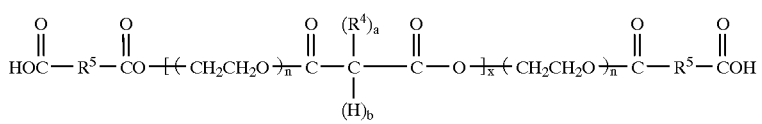
(III)

wherein
$R^4$, n, x, a and b are as previously defined; and
$R^5$ is —CH=CH— or —CH$_2$CH$_2$—;

C. reacting the product formed in step B with formaldehyde to form a hydroxymethylated malonate polyester of the formula:

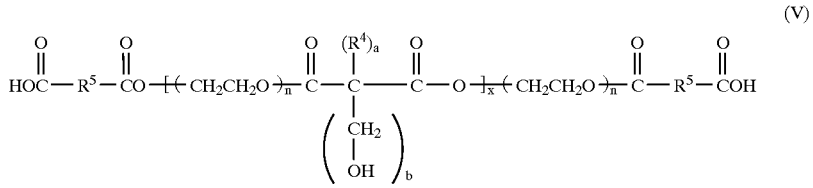
(V)

wherein $R^4$, n, x, a, b and $R^5$ are as previously defined;

D. nitrating the product of step C with HNO$_3$ to produce a nitromalonate polyester of the formula:

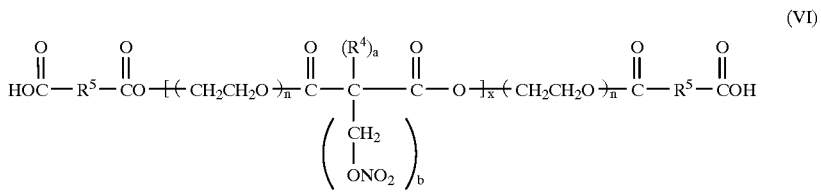
(VI)

wherein $R^4$, n, x, a, b and $R^5$ are as previously defined.

The present invention also provides a method for preparing a nitromalonate polyester comprising:

A. reacting malonic acid or a derivative thereof and a slight excess of a diol to form a hydroxy-terminated malonate polyester of the formula:

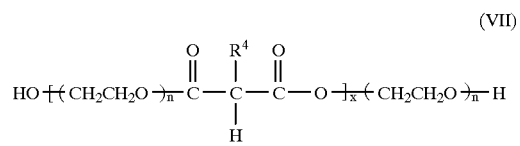
(VII)

wherein
$R^4$ is alkyl;
n is at each independent occurrence an integer from 1 to about 40; and
x is are integer, preferably 1 to about 40;

B. end-capping the hydroxy-terminated malonate polyester formed in step A with a cyclic anhydride to form a malonate polyester of the formula:

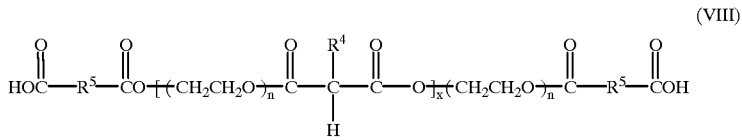

(VIII)

wherein $R^4$, n, and x are as previously defined; and $R^5$ is —CH=CH— or —CH$_2$CH$_2$—; and C. nitrating the product of step B by reacting it with HNO$_3$ to produce a nitromalonate polyester of the formula:

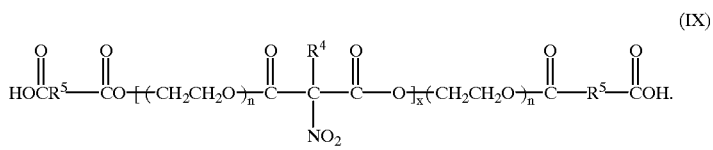

(IX)

wherein $R^4$, n, x, and $R^5$ are as previously defined;

D. reacting the product of step C with formaldehyde to form a hydroxymethylated malonate polyester of the formula:

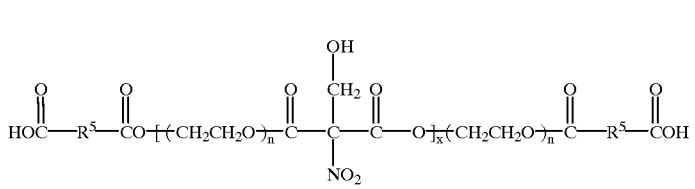

(X)

wherein n, x and $R^5$ are as previously defined; and

E. nitrating the product formed in step D by reacting it with HNO$_3$ to form a nitromalonate polyester of the formula:

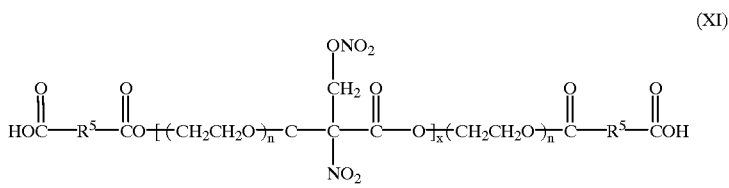

(XI)

wherein n, x and $R^5$ are as previously defined.

This invention also provides a method for preparing a nitromalonate polyester comprising:

A. reacting malonic acid or a derivative thereof and a slight excess of a diol to form a hydroxy-terminated malonate polyester of the formula:

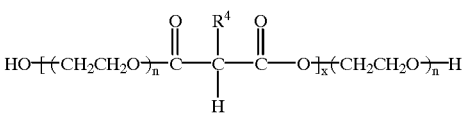

(VII)

wherein $R^4$ is alkyl;

n is at each independent occurrence an integer from 1 to about 40; and x is are integer, preferably from 1 to about 40;

B. end-capping the hydroxy-terminated malonate polyester formed in step A with a cyclic anhydride to form a malonate polyester of the formula:

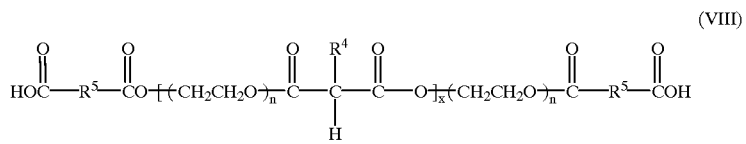

(VIII)

wherein

R⁴, n, and x are as previously defined; and

R⁵ is —CH=CH— or —CH₂CH₂—;

C. nitrating the product of step B with HNO₃ to produce a nitromalonate polyester of the formula:

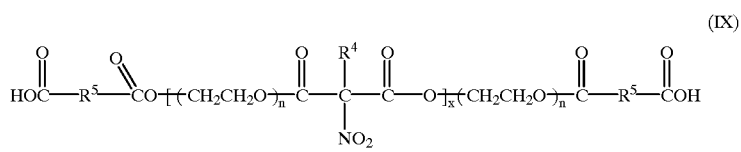

(IX)

wherein R⁴, n, x and R⁵ are as previously defined; and

D. reacting the product of step C with fluorine to produce a fluorinated nitromalonate polyester of the formula:

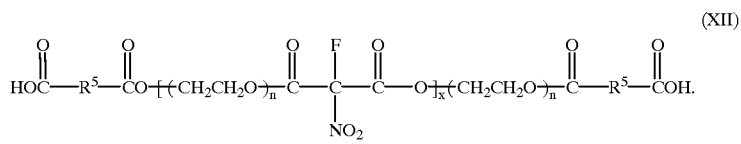

(XII)

This invention further provides a method for preparing a hydroxy-terminated polyester comprising:

A. reacting malonic acid or a derivative thereof and a slight excess of a diol to form a hydroxy-terminated malonate polyester of the formula:

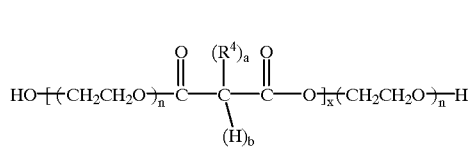

(II)

wherein

R⁴ is alkyl;

n is at each independent occurrence an integer from 1 to about 40; and x is are integer, preferably from 1 to about 40;

a is 0 or 1, b is 1 or 2 and a+b=2;

B. end-capping the hydroxy-terminated malonate polyester formed in step A with a cyclic anhydride to form a malonate polyester of the formula:

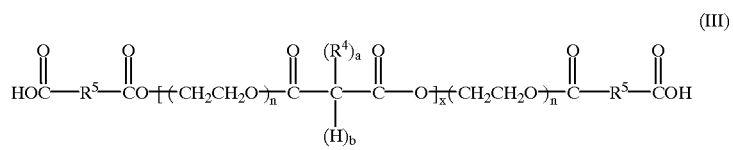

(III)

wherein
  $R^4$, n, x, a and b are as previously defined; and
  $R^5$ is —CH=CH— or —CH$_2$CH$_2$—;
C. nitrating the product of step B with HNO$_3$ to produce a nitromalonate polyester of the formula:

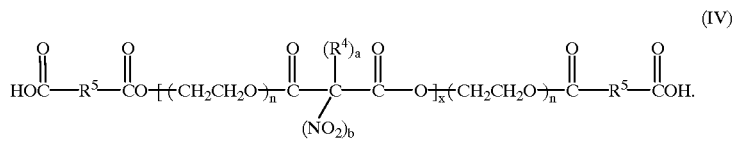
(IV)

wherein $R^4$, n, x, a, b and $R^5$ are as previously defined; and

D. reacting the nitromalonate polyester formed in step C with an alkylene oxide or a polyol (as by reacting the product of step C with SOCl$_2$ followed by reaction with the polyol) to form a hydroxy-terminated nitromalonate polyester of the formula:

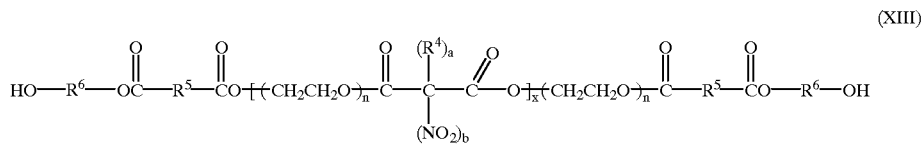
(XIII)

where $R^6$ is alkylene or hydroxy-substituted alkylene.

A method of preparing a hydroxy-terminated nitromalonate polyester is also provided by the present invention comprising:

A. reacting malonic acid or a derivative thereof and a slight excess of a diol to form a hydroxy-terminated malonate polyester having the formula:

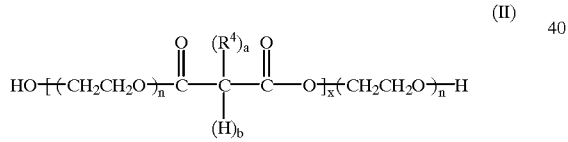
(II)

wherein
  $R^4$ is alkyl;
  n is an integer from 1 to about 40;
  x is and integer, preferably from 1 about 40; and
  a is 0 or 1, b is 1 or 2 and a+b=2;

B. end-capping the hydroxy-terminated malonate polyester formed in step A with a cyclic anhydride to form a malonate polyester of the formula:

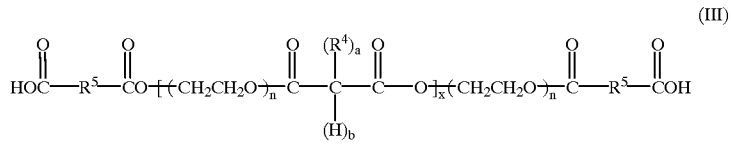
(III)

wherein $R^4$, n, x, a and b are as previously defined; and $R^5$ is —CH=CH— or —CH$_2$CH$_2$—;

C. reacting the product formed in step B with formaldehyde to form a hydroxymethylated malonate polyester of the formula:

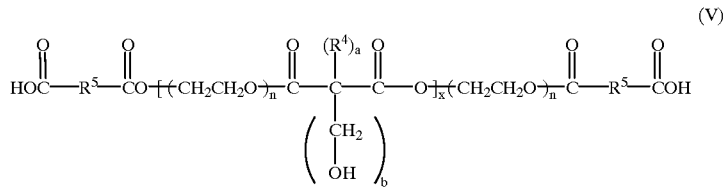
(V)

wherein $R^4$, n, x, a, b and $R^5$ are as previously defined;

D. nitrating the product of step C with $HNO_3$ to produce a nitromalonate polyester of the formula:

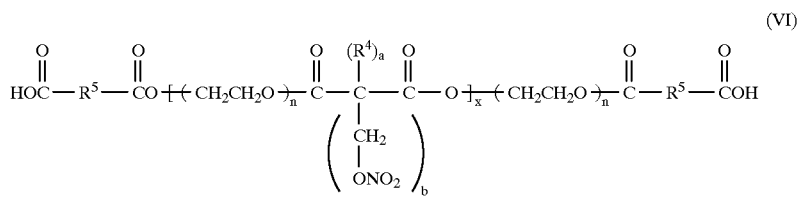
(VI)

wherein $R^4$, n, x, a, b and $R^5$ are as previously defined; and

E. reacting the product formed by step D and an alkylene oxide or a polyol (as by reacting the product of step D with $SOCl_2$ followed by reaction with polyol) to form an hydroxy-terminated nitromalonate polyester of the formula:

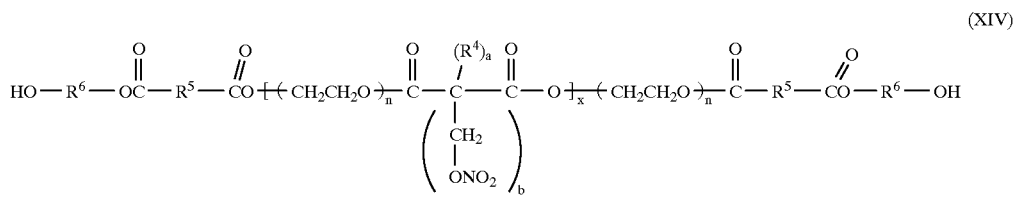
(XIV)

where $R^6$ is alkylene or hydroxy substituted alkylene.

In accordance with the present invention there is further provided a method for preparing an hydroxy-terminated nitromalonate polyester comprising:

A. reacting malonic acid or a derivative thereof and a slight excess of a diol to form a hydroxy-terminated malonate polyester of the formula:

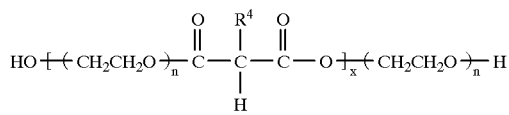
(VII)

wherein $R^4$ is alkyl;

n is at each independent occurence an integer from 1 to about 40; and x is are integer, preferably from 1 to about 40;

B. end-capping the hydroxy-terminated malonate polyester formed in step A with a cyclic anhydride to form a malonate polyester of the formula:

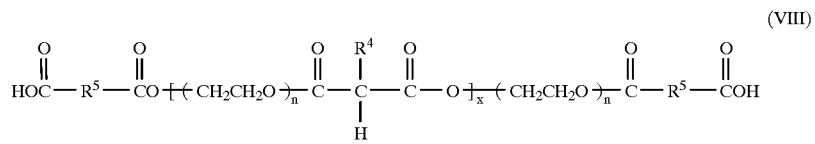
(VIII)

wherein $R^4$, n and x are as previously defined; and $R^5$ is —CH=CH— or —CH$_2$CH$_2$—;

C. nitrating the product of step B with HNO$_3$ to produce a nitromalonate polyester of the formula:

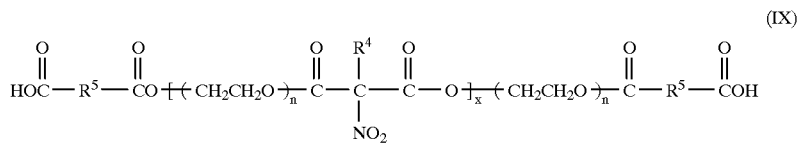

(IX)

wherein $R^4$, n, x and $R^5$ are as previously defined.

D. reacting the product of step C and formaldehyde to form a hydroxymethylated malonate polyester of the formula:

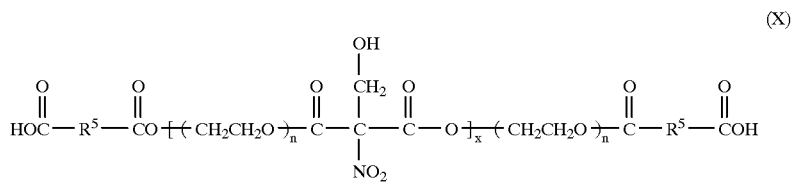

(X)

wherein n, x and $R^5$ are as previously defined;

E. nitrating the product formed in step D by reacting it with HNO$_3$ to form a nitromalonate polyester of the formula:

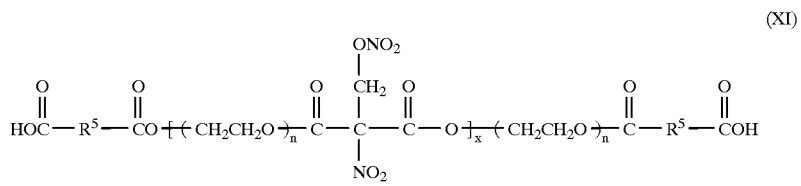

(XI)

wherein n, x and $R^5$ are as previously defined; and

F. reacting the product formed by step E and an alkylene oxide or a polyol (as by reacting the product of step E with SOCl$_2$ followed by reaction with the polyol) to form an hydroxy-terminated nitromalonate polyester of the formula:

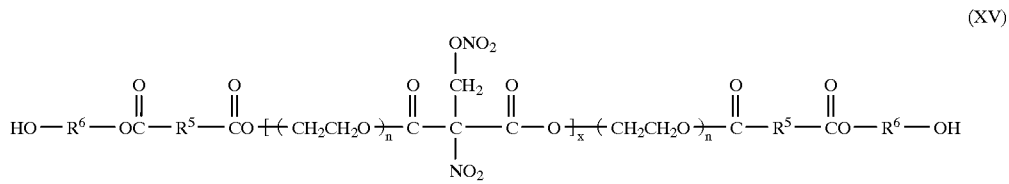

(XV)

wherein n, x and $R^5$ are as previously defined and $R^6$ is alkylene or hydroxy substituted alkylene.

This invention also provides a method for preparing a hydroxy-terminated nitromalonate polyester comprising:

A. reacting malonic acid or a derivative thereof and a slight excess of a diol to form a hydroxy-terminated malonate polyester of the formula:

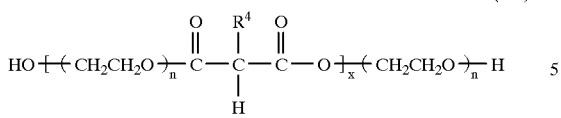
(VII)

wherein $R^4$ is alkyl;

n is at each independent occurrence an integer from 1 to about 40; and x is an integer, preferably from 1 to about 40;

a is 0 or 1, b is 1 or 2 and a+b=2;

B. end-capping the hydroxy-terminated malonate polyester formed in step A with a cyclic anhydride to form a malonate polyester of the formula:

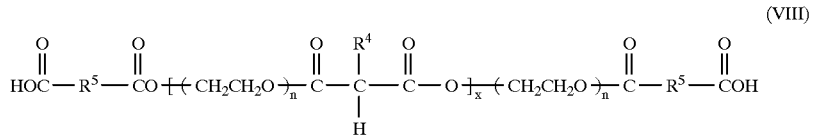
(VIII)

wherein $R^4$, n and x are as previously defined; and $R^5$ is —CH=CH— or —CH$_2$CH$_2$—;

C. nitrating the product of step B with $HNO_3$ to produce a nitromalonate polyester of the formula:

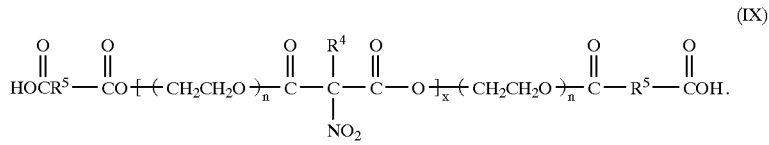
(IX)

wherein $R^4$, n, x and $R^5$ are as previously defined;

D. reacting the product of step C with fluorine to produce a fluorinated nitromalonate polyester of the formula:

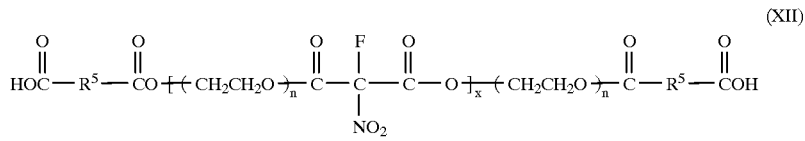
(XII)

wherein n, x and $R^5$ are as previously defined; and

E. reacting the product formed by step D and an alkylene oxide or polyol (as by reacting the product of step D with $SOCl_2$ followed by reaction with the polyol) to form an hydroxy-terminated nitromalonate polyester of the formula:

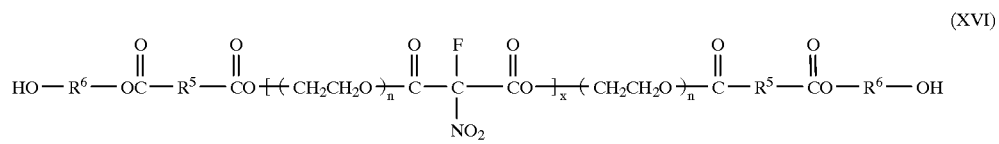
(XVI)

where n, x and $R^5$ are as previously defined and $R^6$ is alkylene or hydroxy substituted alkylene.

DESCRIPTION OF THE PREFERRED EMBODIMENTS

Figure 1:
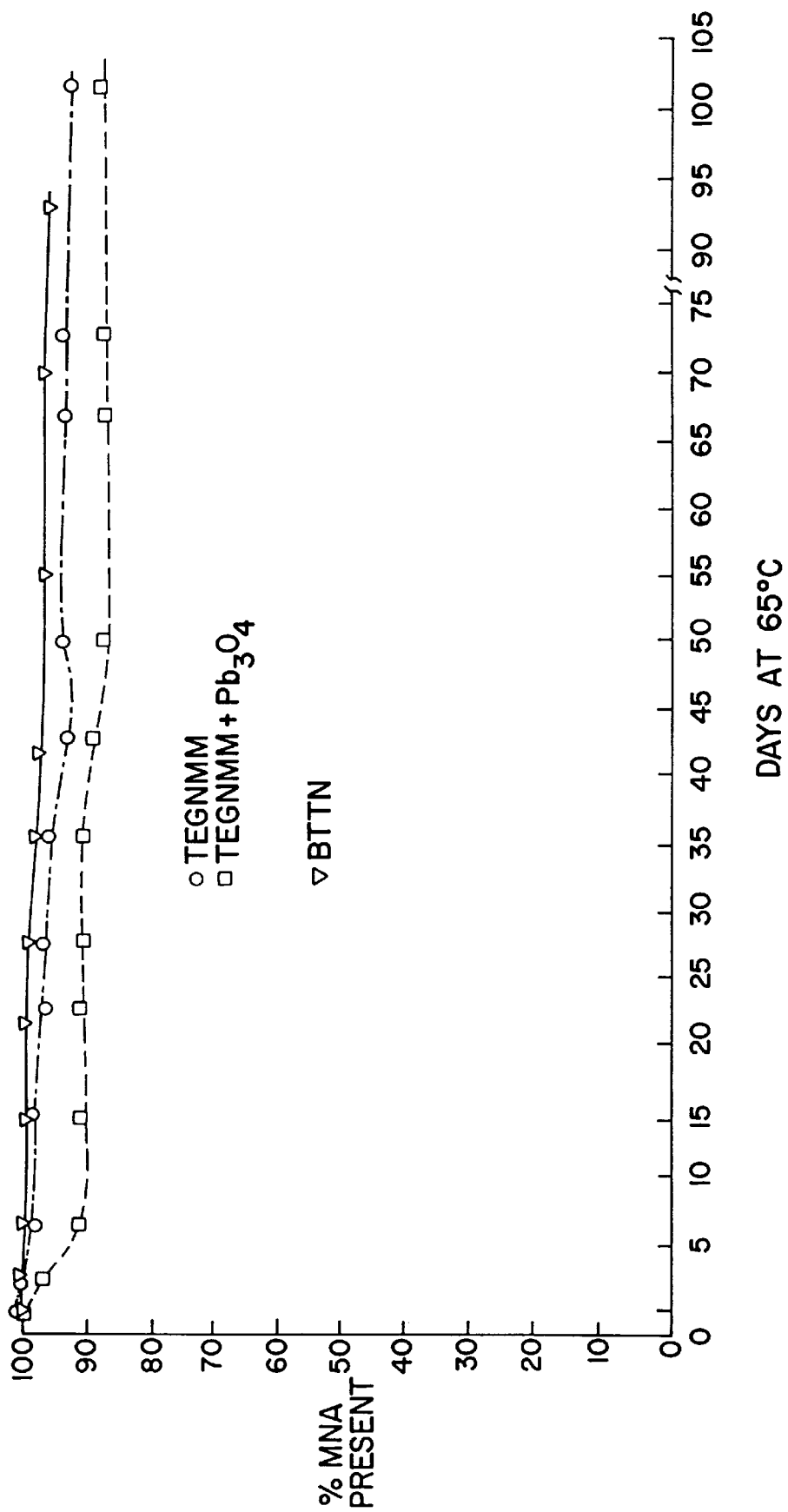
FIG. 1 is a graphical presentation of the amount of N-methyl-4-nitroaniline (MNA) in poly (triethylene glycol nitro methyl malonate) vs. time (see Example 2).

The polymers of this invention are nitromalonate polyesters. As used herein, the term "nitromalonate polyesters" refers to polymers made from malonic acid (or a derivative thereof) and a diol which is subsequently nitrated to introduce $NO_2$ or $ONO_2$ groups onto the polymer backbone. Thus, the nitromalonate polyesters of this invention include polymers having the following general formula:

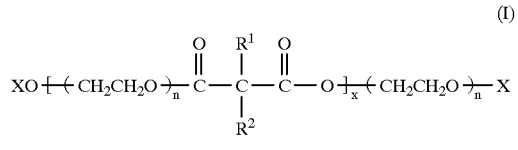

(I)

where
- $R^1$ and $R^2$ are the same or different and are selected from —$NO_2$, —$R^3ONO_2$, alkyl, —F and —H with the proviso that at least one of $R^1$ and $R^2$ is —$NO_2$ or —$R^3ONO_2$;
- $R^3$ is alkylene;
- X is —H,

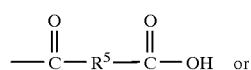 or

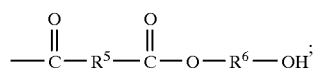;

- $R^5$ is —CH=CH— or —$CH_2CH_2$—;
- $R^6$ is alkylene;
- n is at each independent occurrence an integer from 1 to about 40; and
- x is an integer, preferably from 1 to about 40.

As used herein, the term "alkyl" refers to monovalent, straight or branched chain $C_1$ to $C_4$ hydrocarbyl groups, e.g. methyl, ethyl, butyl and the like. The term "alkylene" refers to divalent, straight or branched chain hydrocarbyl groups, e.g. ethylene.

The preferred nitromalonate polyesters of this invention are those according to formula (I) above where both $R^1$ and $R^2$ are —$CH_2ONO_2$. When used as a propellant binder, these nitromalonate polyesters provide a significant increase in the specific impulse ($I_{sp}$) of a propellant when compared to non-nitrated binders such as polycaprolactone (PCP) or polyethylene glycol (PEG).

The nitromalonate polyesters of this invention may be prepared by any of several processes depending upon the functional groups which are desired to be introduced onto the polymer backbone or as terminal groups or the polymer. These processes all begin with the preparation of a malonate polyester, such as those according to formula (I). The preparation of these malonate polyesters is described in Korshak, et al., Doklady Akad. Nauk S.S.S.R. 94, 61–4 (1954) (Chem. Abst. 49:3823h (1955)) which is hereby incorporated by reference.

The processes of this invention are described in detail below. For the sake of brevity and clarity, the intermediates and products formed in these processes are referred to simply by formula numbers which correspond to the number formulas in the Summary of the Invention.

PROCESS 1

Malonic acid (or derivative) + Diol

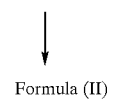

Formula (II)

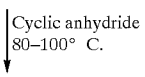 Cyclic anhydride 80–100° C.

Formula (III)

 $HNO_3$

Formula (IV)

PROCESS 2

Malonic acid (or derivative) + Diol

Formula (II)

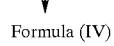 Cyclic anhydride

Formula (III)

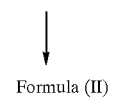

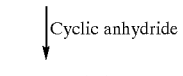 Formaldehyde Aqueous base, e.g. $KCO_3$

Formula (V)

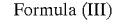 $HNO_3$

Formula (VI)

PROCESS 3

Alkylated Malonic acid (or derivative) + Diol

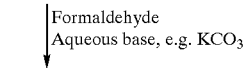

Formula (VII)

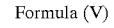 Cyclic anhydride 80–100° C.

Formula (VIII)

 $HNO_3$

-continued

Formula (IX)

$\downarrow$ Formaldehyde
Aqueous base, e.g. KCO$_3$

Formula (X)

$\downarrow$ HNO$_3$

Formula (XI)

PROCESS 4

Alkylated Malonic acid (or derivative) + Diol $\downarrow$

Formula (VII)

$\downarrow$ Cyclic anhydride
80–100° C.

-continued

Formula (VIII)

$\downarrow$ HNO$_3$

Formula (IX)

$\downarrow$ F$_2$

Formula (XII)

PROCESS 5

Malonic acid (or derivative) + Diol $\downarrow$

Formula (II)

$\downarrow$ Cyclic anhydride
80–100° C.

Formula (III)

$\downarrow$ HNO$_3$

Formula (IV)

SOCl$_2$ (CH$_2$Cl$_2$ solvent optional) ↙          ↘ Alkylene oxide

Formula (XIII)

$$Cl-\overset{O}{\underset{\parallel}{C}}-R^5-CO\text{-}[(CH_2CH_2O)_{\overline{n}}\overset{O}{\underset{\parallel}{C}}-\overset{(R^4)_a}{\underset{(NO_2)_b}{C}}-\overset{O}{\underset{\parallel}{C}}-O]_{\overline{x}}(CH_2CH_2O)_{\overline{n}}-\overset{O}{\underset{\parallel}{C}}-R^5-\overset{O}{\underset{\parallel}{C}}-Cl \quad (XVII)$$

$\downarrow$ Polyol
CH$_2$CH$_2$ solvent

Formula (XIII)

PROCESS 6

Malonic acid (or derivative) + Diol $\downarrow$

-continued

Formula (II)
↓ Cyclic anhydride
  80–100° C.

Formula (III)
↓ Formaldehyde
  Aqueous base, e.g. KCO$_3$

Formula (V)
↓ HNO$_3$

Formula (IV)
↙ SOCl$_2$ (CH$_2$Cl$_2$ solvent optional)      ↘ Alkylene oxide

Formula (XIV)

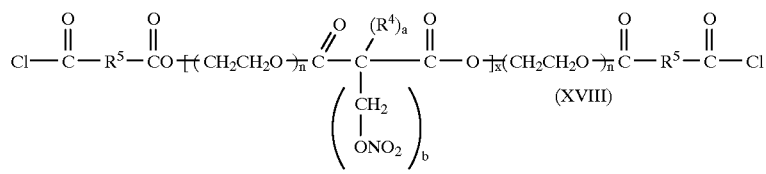

(XVIII)

↓ Polyol
  CH$_2$CH$_2$ solvent

Formula (XIV)

PROCESS 7

Alkylated Malonic acid (or derivative) + Diol
↓

Formula (VII)
↓ Cyclic anhydride
  80–100° C.

Formula (VIII)
↓ HNO$_3$

Formula (IX)
↓ Formaldehyde
  Aqueous base, e.g. KCO$_3$

Formula (X)
↓ HNO$_3$

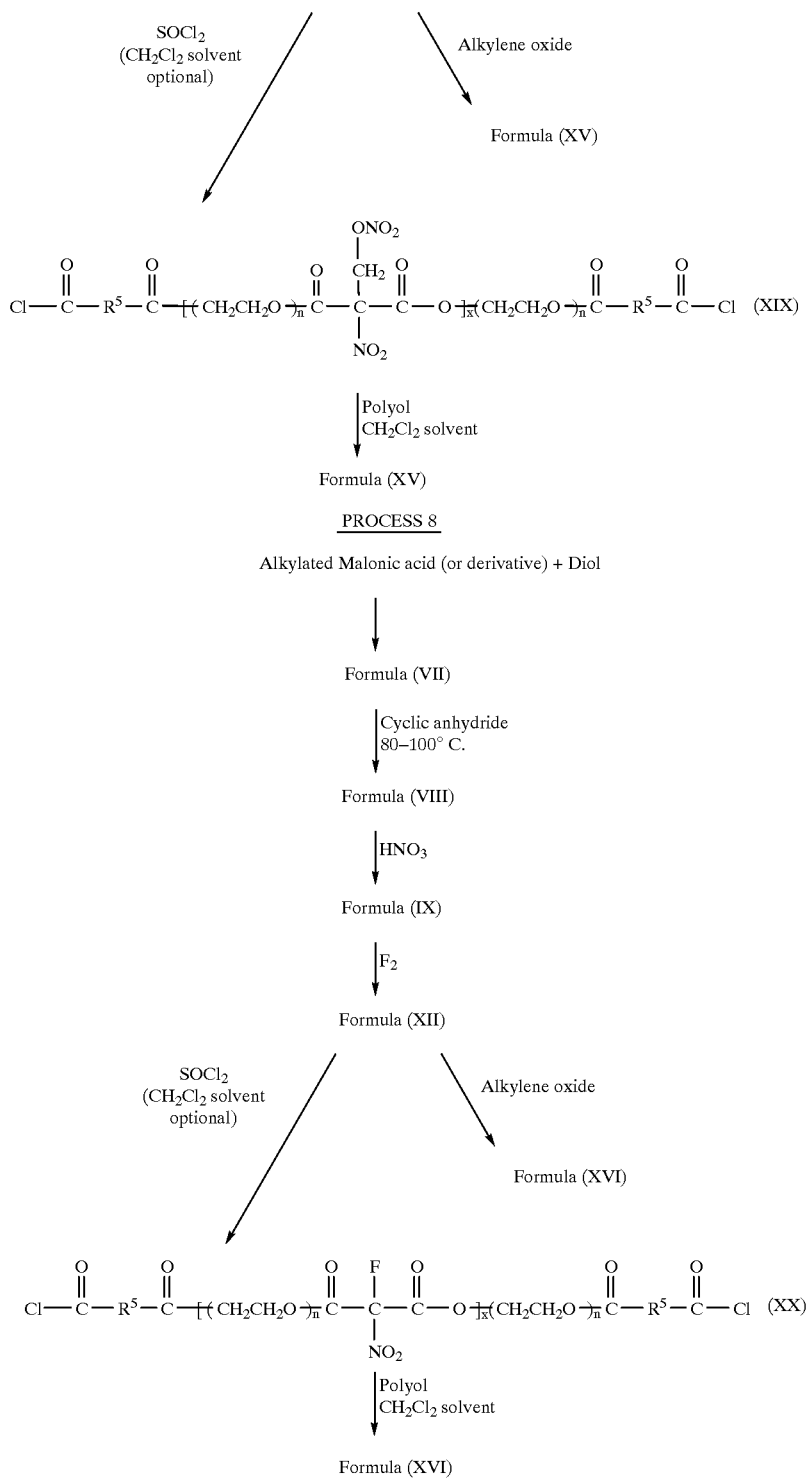

Not all of the exact reaction conditions and procedures (temperatures, reaction times, product recovery procedures and the like) are indicated in the foregoing processes of the present invention, but it is believed that given the above disclosure, one of ordinary skill in the art can determine these reaction conditions and procedures without undue experimentation. In the above processes, the preferred cyclic anhydrides are succinic and maleic anhydride, most preferably maleic anhydride.

The quantities of the reactants used in the foregoing processes may also vary depending upon the product desired. For example, in the nitration steps, if full nitration of the polymer is desired an excess of $HNO_3$ (e.g. 3–5 times the stoichrometric amount) should be employed. If a lower degree of nitration is desired, lesser amounts of $HNO_3$ should be employed. Likewise, when the malonic acid or derivative and the diol are reacted to form the polymer a slight excess of diol (i.e. the molar ratio of diol to malonic acid or derivative is slightly higher than 1:1) should be used. In general, the other reactions shown above should employ a slight excess of reactant to ensure complete reaction. As with the aforementioned reaction conditions, it is believed that, given the above disclosure, one of ordinary skill in the art can determine the proper amounts of reactants needed to produce the desired product without undue experimentation.

The nitromalonate polyesters of this invention are useful as binders for solid propellants. They are especially attractive as high-energy binders for minimum smoke propellants for the following reasons:

1. The nitromalonate polyesters have a high oxygen content which yields an increase in $I_{sp}$ even at relatively low levels of nitration.

2. The nitromalonate polyesters have relatively fluid properties for such highly oxygenated materials, which means lower melting points and glass transition temperatures for the polymer.

3. Being polyester, these polymers have better solubility and compatibility with the nitrate esters commonly employed in propellants than most nitro-containing polymers, which are often high melting solids.

4. The nitromalonate polyesters possess the excellent thermal stability associated with $C-NO_2$ type compounds.

5. These polymers possess good safety and compatibility characteristics.

6. They can be manufactured by simple processes from readily available, low cost starting materials.

7. Resistance of the propellant containing nitromalonate polyesters to plasticizer syneresis and crystallization is improved.

8. Use of the nitromalonate polyesters permits the use of plasticizers in the propellant which would ordinarily crystallize at low temperatures in commonly used binders, and the plasticizer may be substantially free of the expensive compound BTTN.

The solid propellants of this invention also contain a curing agent for the polymer binder. The curing agent must be capable of reacting with the terminal groups on the polymer. When the terminal groups are hydroxyl groups the curing agents can include dicarboxylic compounds although di- or polyisocyanates are preferred. Examples of suitable isocyanates include arylene polyisocyanates such as tolylene diisocyanates; meta-phenylene diisocyanate; 4-chloro-1, 3-phenylene diisocyanate; methylene-bis-(4-phenyl isocyanate); 1, 5-naphthalene diisocyanate; 3, 3'-dimethoxy-4, 4'biphenylene diisocyanate; 3, 3'-diphenyl-4, 4'-biphenylene diisocyanate; triphenylmethane triisocyanate; and alkylene poly-isocyanates such as methylene; ethylene; propylene-1, 2-; butylene-1, 3-; hexylene-1, 6- and cyclohexylene-1, 2-diisocyanates. Mixtures of polyisocyanates may also be used. Desmodur N-100 isocyanate curing agent is most often used. When the terminal groups on the nitromalonate polyester are carboxyl groups, the useful curing agents include polyfunctional epoxides and acylaziridines.

Any oxidizer commonly employed in solid propellants may be used in the propellants of this invention. These exemplary oxidizers include ammonium perchlorate, lithium perchlorate, potassium perchlorate, sodium perchlorate, ammonium chlorate, potassium chlorate, sodium chlorate, ammonium nitrate, lithium nitrate, sodium nitrate, ammonium picrate and the like, and nitramines such as RDX and HMX.

The propellants of this invention also contain a plasticizer, preferably a so-called "energetic plasticizer" which not only effects propellants physical properties, but also contributes to the propellant burn rate and overall energy content. The plasticizer is employed to reduce propellant viscosity, increase propellant strain capacity at low temperature, increase propellant casting life, increase propellant burn rate and energy content and increase pot life. In order for the plasticizer to perform these functions it is essential that the plasticizer not be subject to syneresis or crystallization, even at low temperature.

Because they are energetic plasticizers the nitrate esters are preferred in the practice of this invention. These nitrate esters include, but are not limited to, nitroglycerin; mono-, di- and triethyleneglycol dinitrate; nitrosobutylglycerol trinitrate; trimethylolethane trinitrate; trimethylolmethane trinitrate. Butanetriol trinitrate may also be used as a plasticizer, but it is very expensive. Indeed, one of the advantages of this invention is that when the polymer binders of the invention are employed, butanetriol trinitrate need not be used as a plasticizer whereas its use is essential with other binders.

The metallic fuel, when used in the propellants of this invention, is commonly a powdered metal, preferably aluminum powder.

Other additives may, of course, be employed in the propellant including burn rate enhancers, bonding agents, cure catalysts and the like.

The components of the propellants of this invention may be employed in the amounts indicated in Table A below.

TABLE A

| COMPONENT | Amount (wt % based on total propellant weight) | |
|---|---|---|
| | GENERAL RANGE | PREFERRED RANGE |
| Nitromalonate polyester binder | 3–20 | 5–10 |
| Curing agent | 0.2–5.0 | 0.5–2.0 |
| Oxidizer | 30–80 | 50–70 |
| Plasticizer | 5–40 | 10–30 |
| Fuel | 0–30 | 0–20 |

The solid propellants of this invention may be prepared by conventional techniques. For example, the binder components may be mixed together (except that the curing agent may be withheld until after all other components are mixed) and then the metallic fuel, if used, may be mixed with the binder followed by addition of the oxidizer. The propellant may then be cured in a conventional manner.

EXAMPLE 1

Nitromalonate polyesters were prepared as described in the table below.

| Reaction Mixture | Product Yield | Temperature/ Time | Remarks |
|---|---|---|---|
| 5.0 g CM-TEGM[1] 50 ml $CH_2Cl_2$ solvent 37.5 ml fuming $HNO_3$ (90%) | 5.6 g/93% | Added $HNO_3$ over 0.5 hr. Started at 10° C. warmed slowly to 30° C. Total | Extracted product from ice quench with $CH_2Cl_2$ $H_2O$ wash, |

-continued

| Reaction Mixture | Product Yield | Temperature/ Time | Remarks |
|---|---|---|---|
| | | time, 4.5 hr. | dried over $Na_2SO_4$. Nitration was incomplete. No polymer degradation. |
| 5.0 g TEGM[2] 50 ml $CH_2Cl_2$ solvent 37.5 ml red fuming $HNO_3$ | 5.3 g/88% | Added $HNO_3$ over 0.67 hr. Started at 10° C. warmed slowly to 30° C. Total time 4.5 hr. | Same work-up as above. Nitration complete (by NMR). No polymer degradation. |
| 5.0 g DEGM[3] 50 ml $CH_2Cl_2$ solvent 50 ml fuming $HNO_3$ (90%) | 5.6 g/89% | Added $HNO_3$ over 1.0 hr. Started at 10° C. warmed slowly to 30° C. Total time, 5 hr. | Same work-up as above. Nitration 90% complete (by NMR). No polymer degradation. |
| 5.0 g EGM[4] 60 ml $CH_2Cl_2$ solvent 100 ml fuming $HNO_3$ (90%) | 3.19 g wax 1.00 g solid mp. 83–85° C. | Added $HNO_3$ over 1.0 hr. Started at 10° C. warmed to 30° C. Total time, 3 hr. | Same work-up as above. Waxy portion soluble in $CH_2Cl_2$, solid not. Solid is soluble in acetone and DMSO. |

[1]Carbomethoxy-terminated triethyleneglycol malonate polyester
[2]Hydroxy-terminated triethyleneglycol malonate polyester
[3]Hydroxy-terminated diethyleneglycol malonate polyester
[4]Hydroxy-terminated ethyleneglycol malonate polyester

EXAMPLE 2

The thermal stability of poly (triethylene glycol nitro methyl malonate) (TEGNMM) was investigated. The rate of conversion of N-methyl-4-nitroaniline (MNA) to N-nitroso-N-methyl-4-nitroaniline (NMNA) was used to determine the decomposition rate.

Two samples were prepared by dissolving 3.0 g of TEG-NMM in 7.0 g of triacetin. 1% MNA (w/w) was then added to both samples. 1.5% (w/w) of $Pb_3O_4$ was then added to only one of the samples. As a comparison, a sample of BTTN was prepared containing 1% (w/w) MNA. All three samples were placed in a 65° C. oven and removed on a weekly basis for analysis.

The results from aging the samples in the 65° C. oven for 105 days are presented graphically in FIG. 1. As can be seen, TEGNMM is compatible and stable at 65° C. for long periods of time.

EXAMPLE 3

The following minimum smoke propellant was prepared in a conventional manner using TEGNMM as the binder:

Propellant Composition
    65.7% Total solids
    22.84% Nitrate plasticizer
    6.14% Polymer curing agent (Desmodur N-100 polyisocyanate) and additives
    1/3.72 Polymer/plasticizer ratio
    NCO/OH ratio=2/1

The propellant was subjected to standard safety testing in the uncured state. The results were as follows:

Impact 150 kg-cm

Spark 6.25 Joules

Friction 90 lbs.

Each number represents the point where the propellant failed to ignite or detonate.

The end-of-mix viscosity for the propellant was determined at 128° F. for a 500 g mix and 123° F. for the 400 g mix. The viscosities were determined using a Brookfield viscometer equipped with an "E" spindle with a velocity of one rpm. The viscosities were 3.2 kp for the 400 g mix and 4.8 kp for the 500 g mix.

Figure 2:
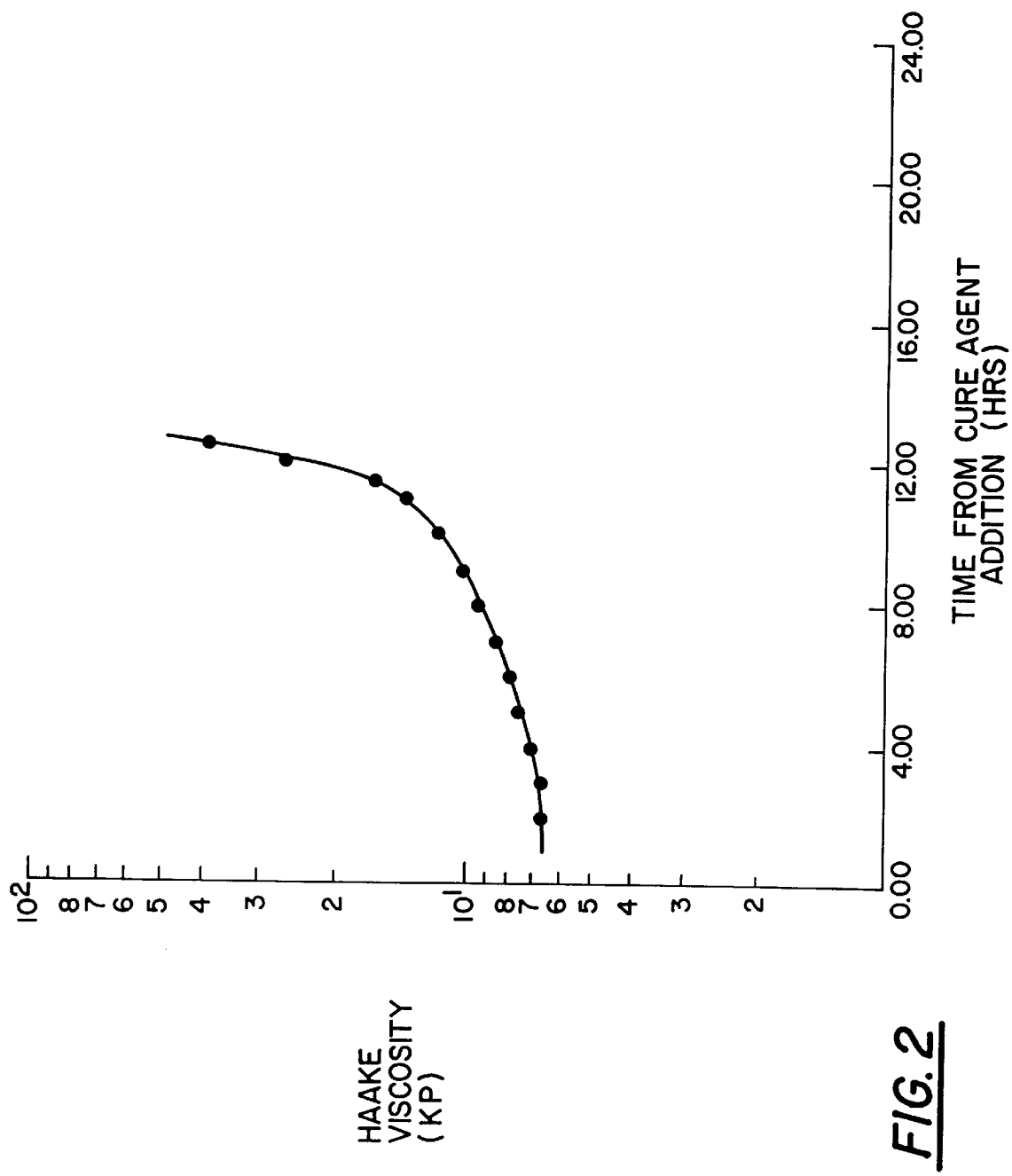
FIG. 2 is a graphical presentation of the HAAKE viscosity of the propellant of Example 2 vs. time.

A potlife profile was determined using a HAAKE viscometer with a smooth cylinder and a shear rate of 0.294 sec$^{-1}$. The profile was determined at 110° F. FIG. 2 is a potlife profile of a 500 g propellant mix prepared with TEGNMM.

Figure 3:
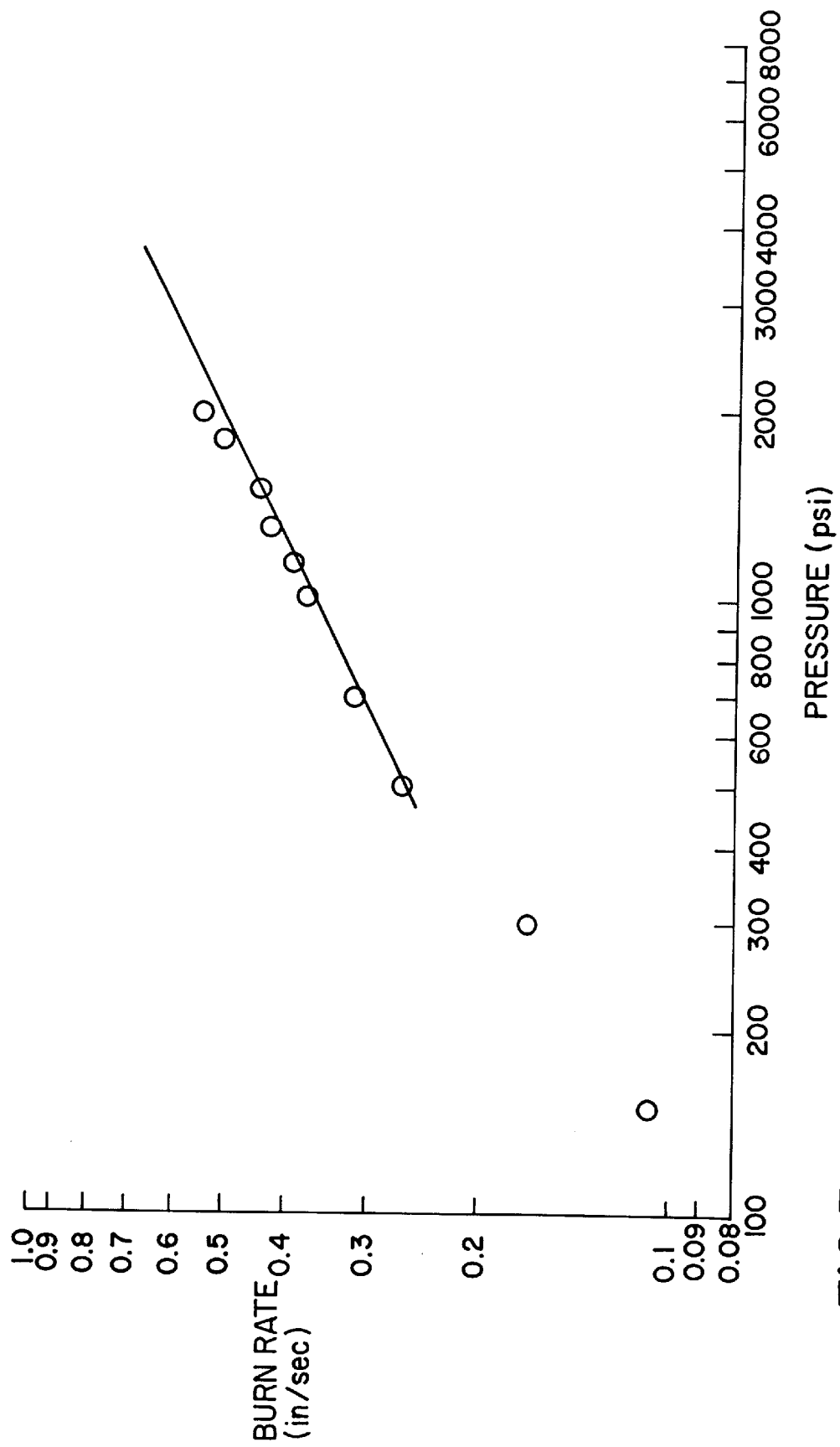
FIG. 3 is a graphical presentation of the burn rate of the propellant of Example 3 vs. pressure.

The burn rate of a 2-inch strand of the propellant was measured as a function of pressure. The results are shown graphically in FIG. 3. The burn rate at 1000 psi was 0.392 in/sec as compared to the baseline formulation (i.e., the propellant composition described above where a 50/50 mixture of PEG and PCP is used as the binder instead of the nitromalonate polyester) which had a burn rate of 0.360 in/sec. This represents a 10% increase in burn rate.

The mechanical properties of the propellant were determined using half-scale JANNAF tensile specimens at 77° C. The results are shown in Table B below.

TABLE B

| | (Half-Scale JANNAF Specimens, Crosshead Speed = 1 in/min) | | | | | | | |
|---|---|---|---|---|---|---|---|---|
| Specimen No. | Tangent Modulus | Secant Modulus at 10% Strain | Strain at Max. Load | Nominal Stress at Max. Load | Strain at Max. Corr. Stress | Max. Corr. Stress | Ultimate Strain | Strain Energy Density to Max. Corr. Stress |
| 1 | 41.7 | 45.6 | 1.511 | 16.1 | 1.511 | 40.4 | 1.511 | 30.94 |
| 2 | 45.7 | 47.8 | 1.296 | 14.3 | 1.296 | 32.9 | 1.315 | 22.84 |
| 3 | 45.8 | 45.2 | 1.537 | 16.0 | 1.537 | 40.6 | 1.545 | 31.58 |
| 4 | 42.2 | 43.1 | 1.391 | 15.0 | 1.391 | 35.8 | 1.398 | 26.15 |
| Avg. | 43.9 | 45.4 | 1.434 | 15.4 | 1.434 | 37.4 | 1.442 | 27.88 |
| Std. Dev. | 2.2 | 1.9 | 0.112 | 0.8 | 0.112 | 3.7 | 0.106 | 4.14 |
| C.V. | 0.0497 | 0.0421 | 0.0779 | 0.0550 | 0.0779 | 0.0998 | 0.0732 | 0.1485 |

The results shown in Table B indicate that the propellant had acceptable mechanical properties.

The thermal stability of the propellant made from the 400 g mix was followed by MNA depletion at 165° C. The rate of MNA depletion was determined by extracting a known amount of propellant with chloroform followed by GC analysis. Table C shows the relative amounts of MNA and N-nitroso MNA (NMNA) product for the propellant made in accordance with the present invention and a similar propellant made from a mix of a standard formulation.

TABLE C

| | Nitromalonate Polyester Propellant | | Comparison | |
|---|---|---|---|---|
| TIME (Days) | MNA (%) | NMNA (%) | MNA (%) | NMNA (%) |
| 0 | 0.370 | 0.053 | 0.379 | 0.082 |
| 7 | 0.308 | 0.115 | 0.184 | 0.313 |
| 14 | 0.263 | 0.174 | 0.113 | 0.385 |
| 21 | 0.239 | 0.208 | 0.020 | 0.468 |
| 28 | 0.197 | 0.246 | | |
| 35 | 0.175 | 0.290 | | |
| 42 | 0.072 | 0.395 | | |

EXAMPLE 4

Table D contains thermochemical calculations for conventional propellant binder systems and for those in accordance with the present invention. It can be readily seen that the $I_{sp}$ values for the nitromalonate polyester binder systems of this invention are significantly higher than those of the conventional binders.

TABLE D

| Binder polymer | %O | $H_f$ (kcal/mole) | $I_{sp}$ (Lb Sec/Lb) 80% HMX/20% Polymer |
|---|---|---|---|
| Polycaprolactone | 28.1 | −103.2 | 216.4 |
| Polyethylene glycol | 36.4 | −46.6 | 224.9 |
| NEGM[1] | 54.9 | −179.6 | 245.2 |
| DNDMEM[2] | 61.53 | −168.3 | 256.8 |
| ONEGM[3] | 58.2 | −188.2 | 252.8 |

[1]Nitromalonate polyester according to formula (I) where $R^1$ is —$NO_2$ and $R^2$ is —H.
[2]Nitromalonate polyester according to formula (I) where $R^1$ and $R^2$ are —$R^3ONO_2$ and $R^3$ is —$CH_2$—.
[3]Nitromalonate polyester according to formula (I) where $R^1$ and $R^2$ are —$NO_2$.

The data in Table D indicates the clear superiority of the nitromalonate polyesters of the present invention or conventional binder systems.

What we claim is:

1. A method of preparing a nitromalonate polyester comprising:

A. reacting malonic acid or a derivative thereof and a slight excess of a diol to form a hydroxy-terminated malonate polyester of the formula:

$$HO \text{-}(\text{-}CH_2CH_2O\text{-})_{\overline{n}}\text{-}\overset{O}{\overset{\|}{C}}\text{-}\overset{(R^4)_a}{\overset{|}{\underset{(H)_b}{C}}}\text{-}\overset{O}{\overset{\|}{C}}\text{-}O\text{-}(\text{-}CH_2CH_2O)_nH$$

wherein
   $R^4$ is alkyl;
   n is at each independent occurrence an integer from 1 to about 40; and
   x is an integer;

B. end-capping the hydroxy-terminated malonate polyester formed in step A with a cyclic anhydride to form a malonate polyester of the formula:

$$HOC\text{-}R^5\text{-}CO\text{-}(\text{-}CH_2CH_2O\text{-})_{\overline{n}}\text{-}\overset{O}{\overset{\|}{C}}\text{-}\overset{(R^4)_a}{\overset{|}{\underset{(H)_b}{C}}}\text{-}\overset{O}{\overset{\|}{C}}\text{-}$$
   $$\text{-}O\text{-}(\text{-}_{\overline{x}}\text{-}CH_2CH_2O\text{-})_{\overline{n}}\text{-}\overset{O}{\overset{\|}{C}}\text{-}R^5\text{-}\overset{O}{\overset{\|}{C}}OH$$

wherein
   $R^4$, n, x, a and b are as previously defined; and
   $R^5$ is —CH=CH— or —$CH_2CH_2$—; and C. nitrating the product of step B with $HNO_3$ to produce a nitromalonate polyester of the formula:

$$HOC\text{-}R^5\text{-}CO\text{-}(\text{-}CH_2CH_2O\text{-})_{\overline{n}}\text{-}\overset{O}{\overset{\|}{C}}\text{-}\overset{(R^4)_a}{\overset{|}{\underset{(NO_2)_b}{C}}}\text{-}\overset{O}{\overset{\|}{C}}\text{-}$$
   $$\text{-}O\text{-}(\text{-}_{\overline{x}}\text{-}CH_2CH_2O\text{-})_{\overline{n}}\text{-}\overset{O}{\overset{\|}{C}}\text{-}R^5\text{-}\overset{O}{\overset{\|}{C}}OH.$$

wherein $R^4$, n, x, a, b and $R^5$ are as previously defined.

2. The process of claim 1 wherein the cyclic anhydride is selected from the group consisting of succinic anhydride and maleic anhydride.

3. A method of preparing a nitromalonate polyester comprising:

A. reacting malonic acid or a derivative thereof and a slight excess of a diol to form a hydroxy-terminated malonate polyester having the formula:

$$HO\text{-}(\text{-}CH_2CH_2O\text{-})_{\overline{n}}\text{-}\overset{O}{\overset{\|}{C}}\text{-}\overset{(R^4)_a}{\overset{|}{\underset{(H)_b}{C}}}\text{-}\overset{O}{\overset{\|}{C}}\text{-}O\text{-}(\text{-}_{\overline{x}}\text{-}CH_2CH_2O\text{-})_{\overline{n}}\text{-}H$$

wherein
   $R^4$ is alkyl;
   n is at each independent occurrence an integer from 1 to about 40;
   x is an integer; and
   a is 0 or 1, b is 1 or 2 and a+b=2;

B. end-capping the hydroxy-terminated malonate polyester formed in step A with a cyclic anhydride to form a malonate polyester of the formula:

$$HOC\text{-}R^5\text{-}CO\text{-}(\text{-}CH_2CH_2O\text{-})_{\overline{n}}\text{-}\overset{O}{\overset{\|}{C}}\text{-}\overset{(R^4)_a}{\overset{|}{\underset{(H)_b}{C}}}\text{-}\overset{O}{\overset{\|}{C}}\text{-}$$
   $$\text{-}O\text{-}(\text{-}_{\overline{x}}\text{-}CH_2CH_2O\text{-})_{\overline{n}}\text{-}\overset{O}{\overset{\|}{C}}\text{-}R^5\text{-}\overset{O}{\overset{\|}{C}}OH$$

wherein
   $R^4$, n, x, a and b are as previously defined; and
   $R^5$ is —CH=CH— or —$CH_2CH_2$—;

C. reacting the product formed in step B with formaldehyde to form a hydroxy-methylated malonate polyester of the formula:

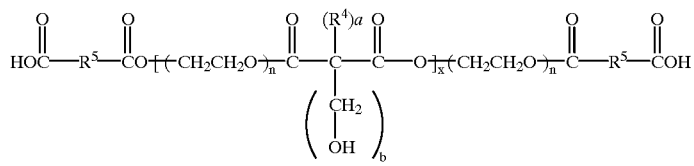

wherein $R^4$, n, x, a, b and $R^5$ are as previously defined; and

D. nitrating the product of step C with $HNO_3$ to produce a nitromalonate polyester of the formula:

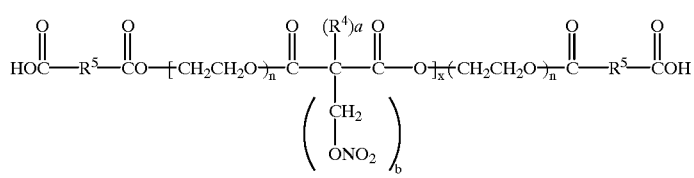

wherein $R^4$, n, x, a, b and $R^5$ are as previously defined.

4. The process of claim 3 wherein the cyclic anhydride is selected from the group consisting of succinic anhydride and maleic anhydride.

5. The method of claim 1 where when a is 1, the product of step C is

D. reacted with formaldehyde to form a hydroxymethylated malonate polyester of the formula:

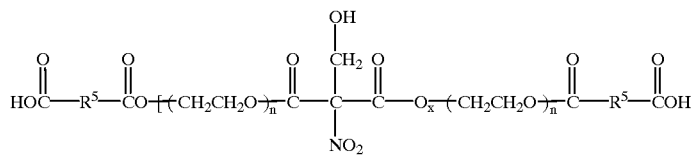

wherein n, x and $R^5$ are as defined in claim 1; and

E. the product formed in step D is nitrated by reacting it with $HNO_3$ to form a nitromalonate polyester of the formula:

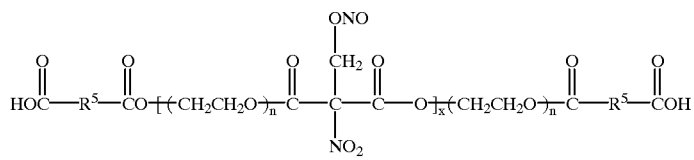

wherein n, x and $R^5$ are as defined in claim 1.

6. The method of claim 1 where when a is 1, the product of step C is:

D. reacted with fluorine to produce a fluorinated nitromalonate polyester of the formula:

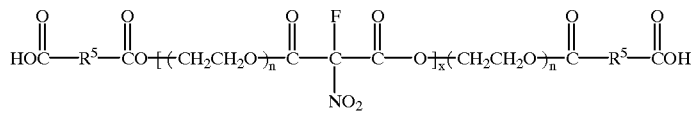
wherein n, x and $R^5$ are as defined in claim 1.
7. The method of claim 1, 3, 5 or 6 wherein the nitromalonate polyester is hydroxy-terminated by reacting the nitromalonate polyester produced in claim 1, 3, 5 or 6 with an alkylene oxide or a polyol.
* * * * *